(12) United States Patent
Phelps, Sr.

(10) Patent No.: US 8,815,192 B1
(45) Date of Patent: Aug. 26, 2014

(54) CYCLICAL SYSTEM AND METHOD FOR REMOVING AND STORING CARBON DIOXIDE OBTAINED FROM A WASTE GAS SOURCE

(76) Inventor: Calvin E. Phelps, Sr., Easton, PA (US)

( * ) Notice: Subject to any disclaimer, the term of this patent is extended or adjusted under 35 U.S.C. 154(b) by 658 days.

(21) Appl. No.: 13/156,405

(22) Filed: Jun. 9, 2011

Related U.S. Application Data

(60) Provisional application No. 61/397,188, filed on Jun. 9, 2010.

(51) Int. Cl.
| | |
|---|---|
| *B01D 53/62* | (2006.01) |
| *B01D 53/75* | (2006.01) |
| *B01D 53/77* | (2006.01) |
| *B01D 53/80* | (2006.01) |
| *B01D 53/81* | (2006.01) |
| *B01D 53/96* | (2006.01) |

(52) U.S. Cl.
USPC ........... 423/231; 423/225; 423/230; 423/605; 423/619; 423/632; 423/633

(58) Field of Classification Search
None
See application file for complete search history.

(56) References Cited

U.S. PATENT DOCUMENTS

2009/0111684 A1* 4/2009 Demirel et al. ............... 502/158

* cited by examiner

*Primary Examiner* — Stanley Silverman
*Assistant Examiner* — Daniel Berns
(74) *Attorney, Agent, or Firm* — LaMorte & Associates, P.C.

(57) ABSTRACT

A cyclical system that uses a metal hydroxide to produce a metal carbonate, remove carbon dioxide from a waste gas source, and produce more metal hydroxide needed for the beginning of the cycle. Initially, the metal hydroxide is mixed with waste gases in a carbon dioxide scrubber. The scrubber reacts the carbon dioxide with the metal hydroxide to produce a metal carbonate. Some of the metal carbon is removed, therein removing carbon dioxide from the environment. Some of the metal carbonate is heated to produce metal oxide and carbon dioxide. The carbon dioxide is drawn away. Oxygen is introduced into the reaction chamber. The oxygen reacts with the metal oxide to produce an oxidized metal oxide and heat. The oxidized metal oxide is reduced with an acid and volatile base to produce metal hydroxide. The metal hydroxide is recycled. The acid is regenerated. The volatile base is recovered and recycled.

20 Claims, 3 Drawing Sheets

CYCLICAL SYSTEM AND METHOD FOR REMOVING AND STORING CARBON DIOXIDE OBTAINED FROM A WASTE GAS SOURCE

RELATED APPLICATIONS

The present invention is a Continuation-In-Part of provisional patent application No. 61/397,188, filed Jun. 9, 2010.

BACKGROUND OF THE INVENTION

1. Field of the Invention

In general, the present invention relates to systems and methods that are used to remove carbon dioxide from a waste gas source for sequestration or to store the collected carbon dioxide by chemically reacting the carbon dioxide into a larger benign molecule.

2. Prior Art Description

Carbon dioxide is one of the most abundant greenhouse gases created by industry. As a result, countries around the world have begun to regulate the amounts of carbon dioxide that are allowed to be released into the environment. Consequently, companies of all types are interested in technologies that enable them to expand production without increasing the amount of carbon dioxide they produce.

In the prior art, there have been many technologies designed to reduce or remove the amount of carbon dioxide being released into the environment through an industrial smokestack. Most of these technologies involve wet scrubbing, absorption systems or, oxy-fuel secondary combustion systems. Unfortunately, the capital costs to capture carbon dioxide using these known methods are very expensive. Furthermore, it is not unusual for a carbon dioxide removal process to increase the energy needs of the overall system by up to thirty percent. As a result, the output of an electrical plant can be decreased by up to thirty percent just by scrubbing the carbon dioxide emissions of that power plant. This, of course, results in the need for more and larger power plants, which produces more greenhouse gases, uses more resources, and thus produces more pollution.

A great need therefore exists for a system and method that can economically remove carbon dioxide from a waste gas source without increasing the energy needs of the system that produces the waste gas source. A great need also exists for a system and method of efficiently storing the carbon dioxide in a stable form once the carbon dioxide has been removed from the waste gas stream. These needs are met by the present invention as described and claimed below.

SUMMARY OF THE INVENTION

The present invention is a cyclical system that uses a metal hydroxide to produce a metal carbonate, removes carbon dioxide from a waste gas source, and produces the metal hydroxide needed for the beginning of the cycle.

Initially a metal hydroxide is provided. The metal hydroxide is mixed with waste gases in a carbon dioxide scrubber. The carbon dioxide scrubber reacts the carbon dioxide with the metal hydroxide to produce a metal carbonate. Some of the metal carbon is removed, therein removing carbon dioxide from the environment. However, in order to perpetuate the cycle, at least some of the metal carbonate is heated in a reaction chamber to a temperature that reduces the metal carbonate to metal oxide and carbon dioxide gas. The carbon dioxide gas is drawn out of the reaction chamber.

Oxygen is introduced into the reaction chamber. The oxygen reacts with the metal oxide to produce an oxidized metal oxide and excess heat. The oxidized metal oxide is reduced with an acid and volatile base to produce metal hydroxide. The metal hydroxide is recycled back to the beginning of the process. The acid to produce the metal hydroxide is efficiently regenerated and the volatile base is recovered for recycling. The result is a system and method that removes carbon dioxide from the environment and is self-sustaining in that it produces its own energy and generates the metal hydroxide needed at the beginning of the operational cycle.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system can be embodied in many ways, the embodiments illustrated show the system being used to remove carbon dioxide from an industrial waste gas source. These embodiments are selected in order to set forth some of the best modes contemplated for the invention. The illustrated embodiments, however, are merely exemplary and should not be considered a limitation when interpreting the scope of the appended claims.

Figure 1:
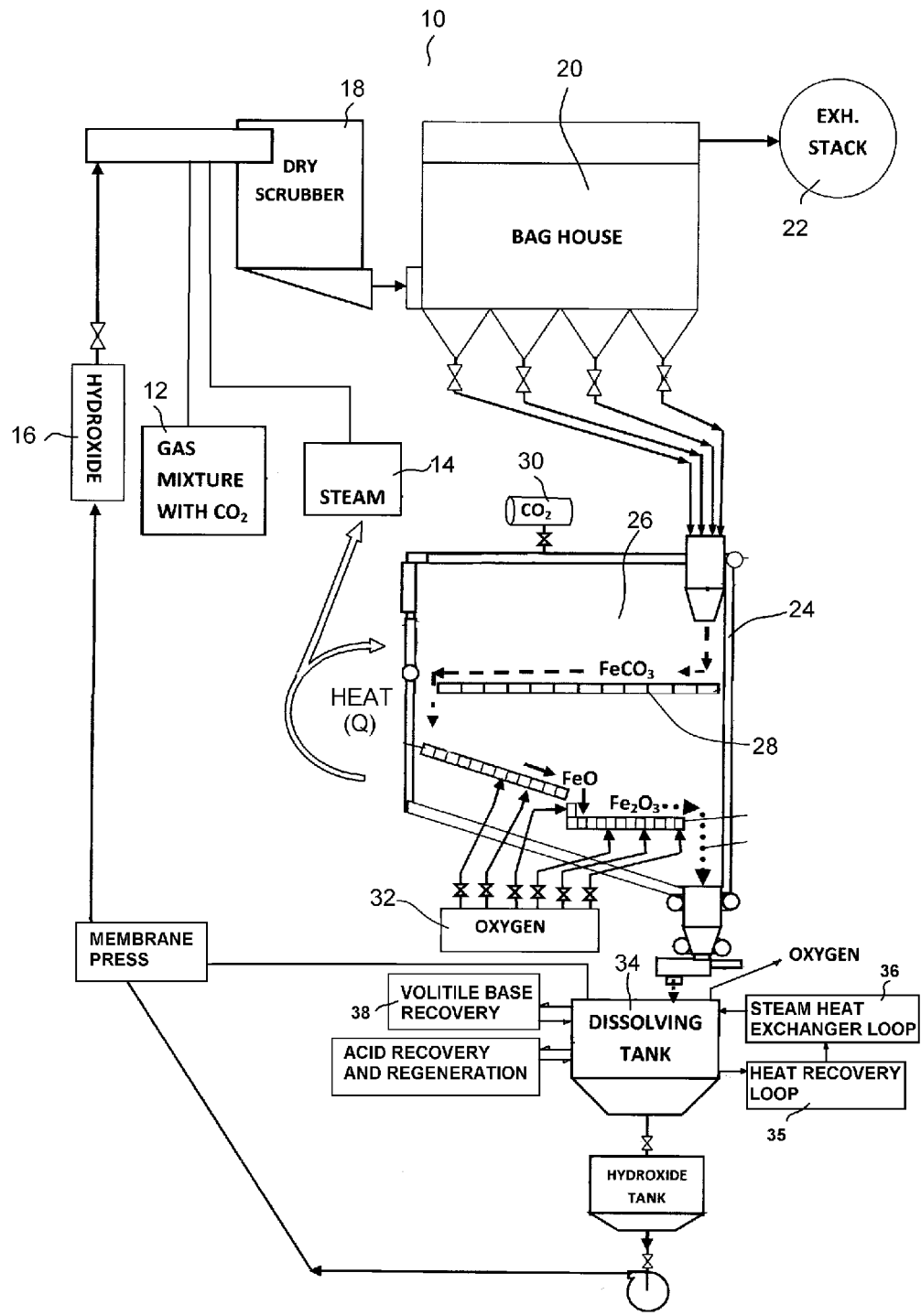
FIG. 1 is a schematic of an exemplary system in accordance with the present invention.
Figure 2:
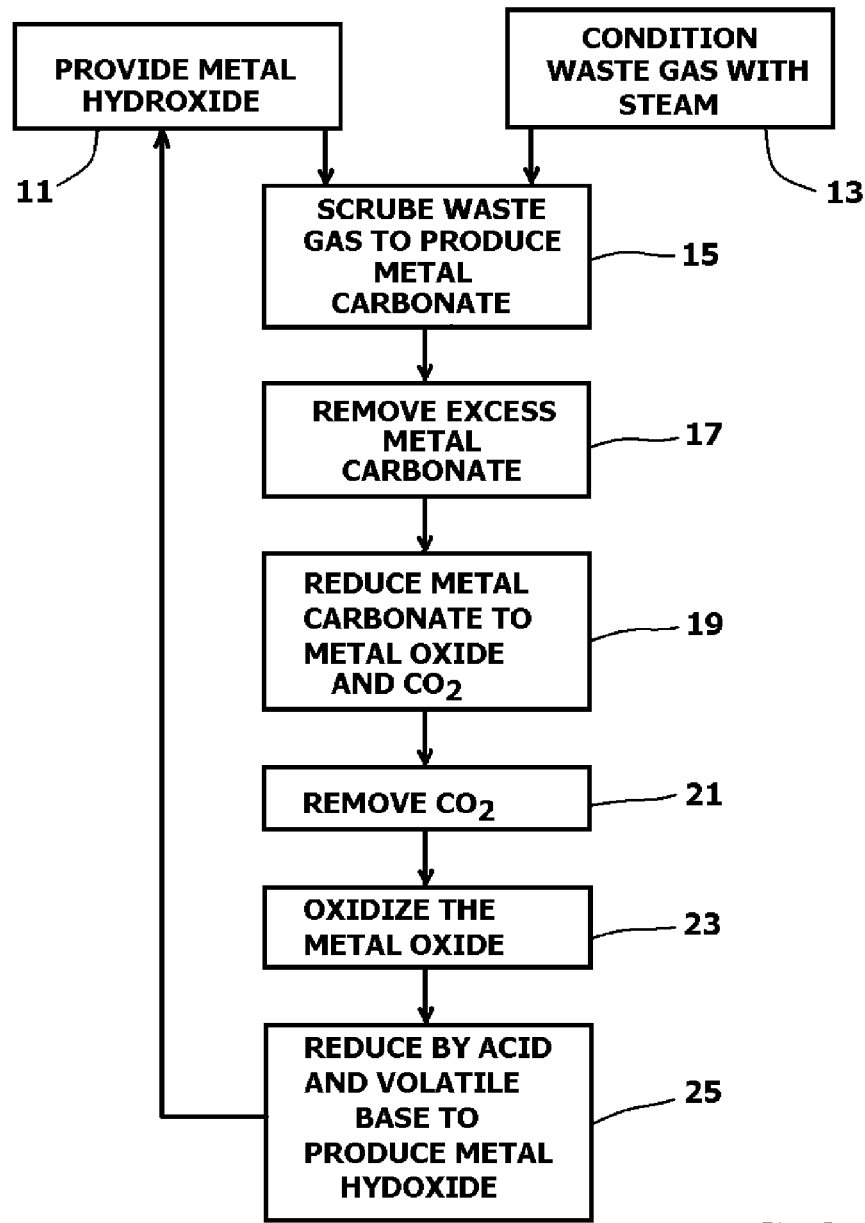
FIG. 2 is a block diagram outlining a method of operation for the system shown in FIG. 1.

FIG. 1 shows an exemplary system 10 for removing carbon dioxide from a waste gas source. FIG. 2 is related to FIG. 1, in that FIG. 2 shows the operational processes used by the system 10 of FIG. 1. Referring to FIG. 1 and FIG. 2 together, it can be seen that access is provided to a waste gas source 12. The waste gas source 12 contains high concentrations of carbon dioxide, as well as other common waste gases, such as water vapor, nitrogen, oxygen, and carbon monoxide.

The gases of the waste gas source 12 are indirectly heated with steam 14 to ensure that any water vapor in the waste gas source 12 is superheated to at least 50° F. above its dew point at ambient pressure as it exits the scrubber and enters the dry filtration unit.

The conditioned waste gases are then mixed with a metal hydroxide reactant 16 in a commercial dry scrubber 18. See Blocks 11, 13 and 15. The metal hydroxide reactant 16 is preferably ferrous hydroxide Fe (OH)$_2$. However, other hydroxides, such as manganese hydroxide and lead hydroxide may be used. Thermal decomposition of carbonates formed from certain hydroxides creates oxides, which may be oxidized to release heat and reduce the amount of endothermic heat required for decomposition. Ferrous hydroxide is preferred for cost, availability, and environmental reasons. Within the dry scrubber 18, the ferrous hydroxide captures much of the carbon dioxide present in the conditioned waste gases to form iron carbonate (FeCO$_3$). Within the dry scrubber 18, the carbon dioxide (CO$_2$) reacts with the water vapor (H$_2$O) and reagent spray water to produce bicarbonate (HCO$_3^-$) or carbonic acid (H$_2$CO$_3$), pursuant to Equation 1 presented below:

$$CO_2 + H_2O \rightarrow H_2CO_3 \qquad \text{Equation 1}$$

The carbonic acid is unstable and quickly reacts with the metal hydroxide reactant 16, pursuant to Equation 2, presented below:

$$Fe(OH)_2 + H_2CO_3 \rightarrow FeCO_3 + 2H_2O \qquad \text{Equation 2}$$

The reaction produces iron carbonate ($FeCO_3$) and water ($H_2O$). The iron carbonate is a solid that has a value as a commodity. As such, some of the unneeded iron carbonate can be removed and sold. See Block 17. Alternatively, the iron carbonate can simply be stored or buried as a solid. In its solid state, the iron carbonate binds its carbon and oxygen molecules and will not release these molecules in the form of carbon dioxide as may be evidenced by these naturally occurring ores of iron.

The iron carbonate exits the dry scrubber 18 and is collected as a solid in a bag house 20 or other conventional collector. The remaining waste gases are exhausted through an exhaust stack 22.

A reactor 24 is provided that defines an isolated internal reaction chamber 26. Within the reaction chamber 26 are vibrating grates, rotating drums, or support structures 28 capable of holding and agitating the iron carbonate. Reaction chamber 26 may be arranged as commercial fluidized beds. A two-step reaction occurs within the reaction chamber 26. In the first step, some of the iron carbonate is heated to its decomposition temperature, which is approximately between 900° F. and 1000° F. See Block 19. At this operating temperature, the iron carbonate breaks down to form ferrous oxide (FeO) and carbon dioxide ($CO_2$) pursuant to Equation 3, expressed below:

$$FeCO_3 + Q_{in}(\text{heat}) \rightarrow FeO + CO_2 \qquad \text{Equation 3}$$

The reaction requires heat ($Q_{in}$) and is thus endothermic. Furthermore, the carbon dioxide produced by the reaction is highly purified since all other gases initially contained in the waste gas have been previously vented. The purified carbon dioxide 30 is drawn out of the reaction chamber 26 as a gas. See Block 21. The purified carbon dioxide 30 also has value as a commodity and can be compressed, stored in tanks, piped to customers, and sold. Once the carbon dioxide 30 is removed from the reaction chamber 26, what remains in the reactor chamber 26 is the ferrous oxide.

After the carbon dioxide 30 is drawn away, the second reaction step is initiated. In the second reaction step, oxygen 32 is introduced into the reaction chamber 26 to oxidize the remaining metal oxide. See Block 23. The oxygen 32 supplied can be purified oxygen. However, ambient air is sufficient in its oxygen content to sustain the desired reaction. In the presence of the oxygen 32, the ferrous oxide reacts to form ferric oxide ($Fe_2O_3$). The reaction is a highly exothermic combustion that releases heat, pursuant to Equation 4 presented below:

$$4FeO + O_2 \rightarrow 2Fe_2O_3 + Q_{out}(\text{heat}) \qquad \text{Equation 4}$$

The heat (Qout) released by the rapid oxidation of the ferrous oxide (FeO) of Equation 4 is greater than the heat (Qin) required by the reaction of Equation 3. Consequently, the heat (Qout) being released by the reaction of Equation 4 is greater than what is needed to run the reactor 24. The reactor 24, therefore, is self-sustaining with regard to operational energy requirements. Furthermore, it will therefore be understood that the reactor 24 produces a surplus amount of heat (Qout−Qin) that can be used for other purposes, such as producing the steam 14.

The ferric oxide ($Fe_2O_3$) produced by the reaction of Equation 4 is a solid. The ferric oxide is passed into a dissolving tank 34, where heat recovery may be initiated by heat exchanging loop 35, depending on solubility limits of the selected volatile base. The dissolving tank 34 is then injected with a reducing acid solution and a volatile base solution to produce an optimum dissolution pH of about 3.5. A preferred reducing acid is citric acid, however other reducing acids can be used. The reducing acid can be concentrated up to its solubility limit to minimize quantities of water. The ferric oxide reacts with the acid solution in a dissolution process and the oxygen is vented. To form ferrous hydroxide ($Fe(OH)_2$), See Block 25. The ferrous hydroxide is precipitated from solution by injecting a volatile base such as trimethylamine to increase the pH>9 and it settles to the bottom of the dissolving tank 34 where the ferrous hydroxide is removed. The ferrous hydroxide solids are concentrated in conventional hydro-cyclones, centrifuges, membrane presses, or other means, and is washed to conserve acid and then recycled for use as the metal hydroxide reactant 16 in reacting the newly incoming waste gases in the dry scrubber 18. See Equation 1 previously presented.

For cost reasons, most of the acid is regenerated as practiced in other known processes using acid chelants. Some examples include hydrometallurgy and metal cleaning in which the dissolved metals are extracted and acid is recovered by resin ion exchange, electrochemically, or by dialysis. In this invention, ferrous hydroxide is precipitated from the acid by increasing solution pH>9 at a temperature compatible with solubility limits of the injected volatile base. Most of the volatile base is recovered by swinging the solution temperature to about 212° F., when the solubility of the volatile base is negligible and it can be withdrawn and recovered 38. The solution temperature in this invention is increased with the heat of condensation from steam heat exchanger loop 36. The acid solution is then cooled by heat recovery loop 35 and returned to its dissolution pH of about 3.5 for the next cycle.

In known processes, caution is advised when heating and reacting ammonia or a primary or secondary amine with citric acid since amides may be formed, which are nearly neutral, resisting hydrolysis and degrading the solution.

It will therefore be understood that the present invention system 10 reacts carbon dioxide with a metal hydroxide reactant 16 to create a metal carbonate, such as iron carbonate. The metal carbonate can be stored, thereby removing the carbon dioxide from the environment. Furthermore, the present invention system 10 is cyclically self-sustaining in that it both produces the metal hydroxide reactant 16 it needs to operate and it produces the heat needed to operate. The result is a highly cost efficient method to remove carbon dioxide gas from a gas stream and reduce the carbon dioxide emissions from an industrial process.

Figure 3:
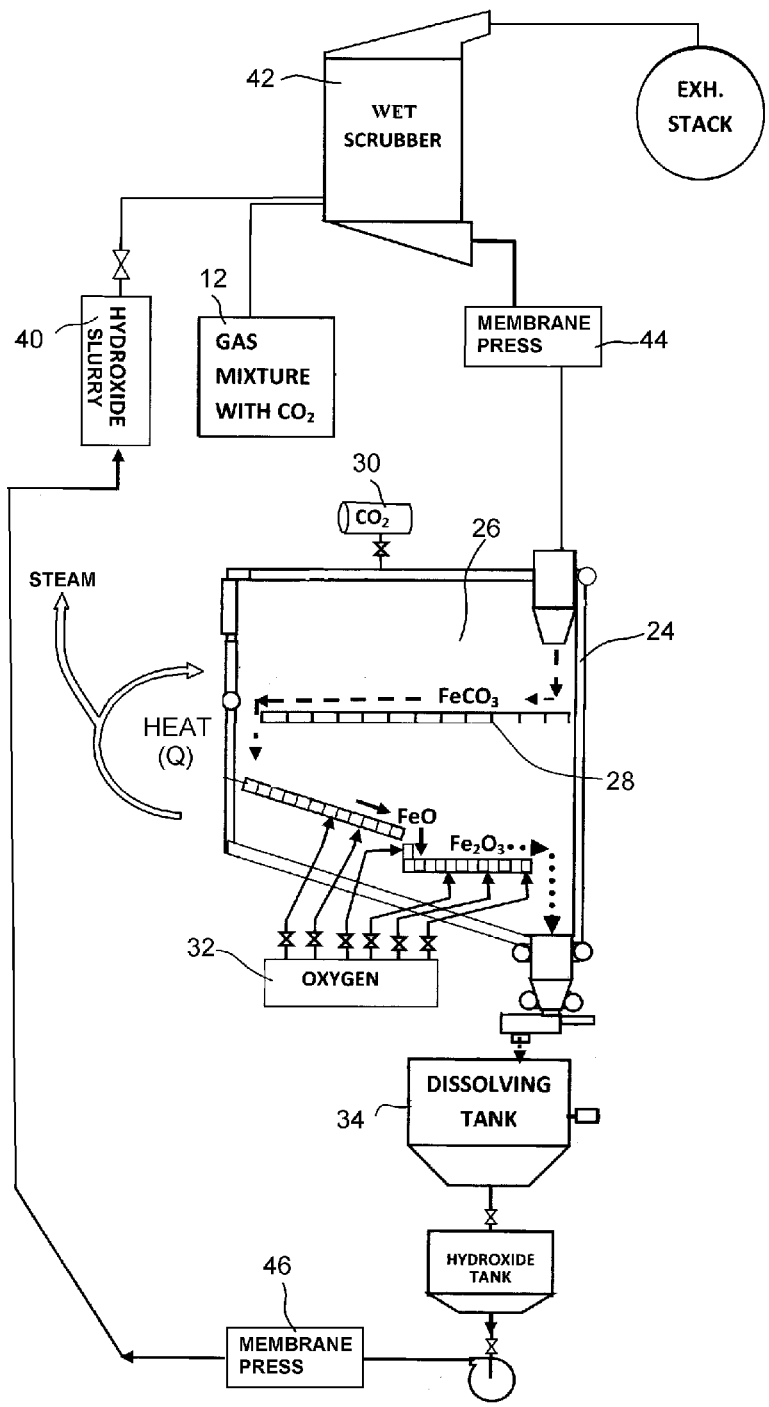
FIG. 3 is a schematic of an alternate exemplary system.

In the exemplary embodiment of FIG. 1, the iron carbonate is produced by dry scrubbing the gases from the waste gas source 12 with ferrous hydroxide. However, there exist alternative processes to scrub waste gases. One of the most commonly used is wet scrubbing. Referring now to FIG. 3, a system that utilizes wet scrubbing is illustrated. Since the system of FIG. 3 has many similar parts to the system of FIG. 1, the same reference numbers will be used to identify the same system components so as to reduce confusion.

Referring to FIG. 3 it can be seen that the gases from the waste gas source 12 are mixed with a slurry 40 of ferrous hydroxide $Fe(OH)_2$ in a commercial wet scrubber 42. Other metal hydroxides, such as manganese hydroxide and lead hydroxide may be used. However, ferrous hydroxide is preferred for cost, availability, and environmental reasons. Within the wet scrubber 42, the ferrous hydroxide captures much of the carbon dioxide present to form iron carbonate (FeCO$_3$). The iron carbonate is separated from the remnants of the slurry 40 in a first membrane press 44.

Once the iron carbonate is isolated, it can be collected and sold as a commodity. Alternatively, the iron carbonate can simply be stored or buried as a solid. In its solid state, the iron carbonate binds its carbon and oxygen atoms and will not release these atoms in the form of carbon dioxide molecules as may be evidenced in naturally occurring reserves of this ore.

A reactor 24 is provided that defines an internal reaction chamber 26. Within the reactor 24, some of the iron carbonate is heated to its decomposition temperature, which is approximately between 900° F. and 1000° F. At this operating temperature, the iron carbonate breaks down to form ferrous oxide (FeO) and carbon dioxide (CO$_2$) pursuant to Equation 3, which was previously presented. Once produced, the purified carbon dioxide 30 is drawn out of the reactor 24 as a gas and its sensible heat is recovered. The purified carbon dioxide 30 gas also has value as a commodity and can be compressed, stored in tanks and sold. Once the carbon dioxide 30 is removed from the reactor 24, what remains in the reactor 24 is the ferrous oxide.

As the carbon dioxide is drawn away, oxygen 32 is introduced into the reactor 24. The oxygen 32 supplied can be purified oxygen. However, ambient air is sufficient in its oxygen content to sustain the desired reaction. In the presence of the oxygen 32, the ferrous oxide reacts to form ferric oxide (Fe$_2$O$_3$). The reaction is a highly exothermic combustion that releases heat, as has previously been explained. The heat being released by the reaction is greater than what is needed to run the reactor 24. It will therefore be understood that the reactor 24 produces a surplus amount of heat that can be used for other purposes.

The ferric oxide (Fe$_2$O$_3$) produced by the reaction is a solid. The ferric oxide is then passed into a dissolving tank 34. The dissolving tank 34 contains a reducing acid solution as explained previously. To demonstrate that different reducing acids can be used, the reducing acid solution may be changed to hydrochloric acid (HCl). The ferrous oxide reacts with the acid solution to form iron chloride (FeCl$_2$). The slurry containing the iron chloride is then reacted with sodium hydroxide to produce ferrous hydroxide and saleable sodium chloride (NaCl). The chemicals introduced in this case are consumed by the process and must be continuously replaced. The ferrous hydroxide is separated using a second membrane press 46. The ferrous hydroxide is cleaned and is recycled for use in reacting the newly incoming waste gases in the wet scrubber.

It will therefore be understood that the present invention system reacts carbon dioxide with ferrous hydroxide to create iron carbonate. The iron carbonate can be stored, thereby removing carbon dioxide from the environment. Furthermore, the present invention system is self-sustaining in that it both produces the ferrous hydroxide it needs to operate and it produces the heat heeded to operate. Also, the acid is regenerated and the volatile base is recovered. The result is a highly cost efficient method of removing carbon dioxide gas from a gas stream and thus reduce the carbon dioxide emissions from an industrial process.

It will be understood that the embodiments of the present invention that are illustrated and described are merely exemplary and that a person skilled in the art can make many variations to those embodiments. For instance, other metal hydroxides, such as manganese hydroxides can be substituted for the ferrous hydroxide in either of the shown embodiments, provided appropriate process equipment, acids, bases, and operating and design parameters are incorporated. Furthermore, reacting the metal oxide with carbon dioxide in a scrubber can be accomplished in scrubber types that differ from the dry scrubber and wet scrubber used as examples. All such embodiments are intended to be included within the scope of the present invention as defined by the claims.

What is claimed is:

1. A method of removing carbon dioxide gas from a gas stream, said method comprising the steps of:
   providing a metal hydroxide;
   reacting said carbon dioxide gas with said metal hydroxide to produce a metal carbonate;
   heating at least some of said metal carbonate in a reaction chamber to a temperature that reduces said metal carbonate to metal oxide and carbon dioxide gas;
   drawing said carbon dioxide gas out of said reaction chamber;
   introducing oxygen into said reaction chamber, wherein said oxygen reacts with said metal oxide to produce an oxidized metal oxide and excess heat;
   reducing said oxidized metal oxide with an acid and a volatile base to produce said metal hydroxide.

2. The method according to claim 1, wherein said metal hydroxide is selected from a group consisting of ferrous hydroxide, manganese hydroxide, and lead hydroxide.

3. The method according to claim 1, wherein said metal hydroxide includes ferrous hydroxide, said metal carbonate includes iron carbonate, said metal oxide includes ferrous oxide and said oxidized metal oxide includes ferric oxide.

4. The method according to claim 1, wherein said step of reacting said carbon dioxide gas with said metal hydroxide to produce a metal carbonate is conducted in a carbon dioxide scrubber.

5. The method according to claim 4, wherein said carbon dioxide scrubber is a dry scrubber.

6. The method according to claim 4, wherein said carbon dioxide scrubber is a wet scrubber.

7. The method according to claim 1, wherein said step of heating at least some of said metal carbonate in a reaction chamber requires a predetermined amount of heat.

8. The method according to claim 7, wherein said excess heat produced by said step of introducing oxygen into said reaction chamber is greater than said predetermined amount of heat.

9. A cyclical method of producing an ending volume of metal hydroxide using a starting volume of metal hydroxide, said method comprising the steps of:
   providing a gas source that contains carbon dioxide;
   providing a starting volume of metal hydroxide;
   reacting said carbon dioxide with said starting volume of metal hydroxide to produce a metal carbonate;
   heating at least some of said metal carbonate to a temperature that reduces said metal carbonate to metal oxide and carbon dioxide;
   separating said metal carbonate from said carbon dioxide;
   reacting said metal oxide with oxygen to produce an oxidized metal oxide and excess heat;
   reducing said oxidized metal oxide with an acid and volatile base to produce said ending volume of metal hydroxide.

10. The method according to claim 9, wherein said metal hydroxide is selected from a group consisting of ferrous hydroxide, manganese hydroxide, and lead hydroxide.

11. The method according to claim 9, wherein said metal hydroxide includes ferrous hydroxide, said metal carbonate includes iron carbonate, said metal oxide includes ferrous oxide and said oxidized metal oxide includes ferric oxide.

12. The method according to claim 9, wherein said step of reacting said carbon dioxide with said starting volume of metal hydroxide to produce a metal carbonate is conducted in a carbon dioxide scrubber.

13. The method according to claim 12, wherein said carbon dioxide scrubber is a dry scrubber.

14. The method according to claim 12, wherein said carbon dioxide scrubber is a wet scrubber.

15. A cyclical method of converting gaseous carbon dioxide into a metal carbonate said method comprising the steps of:
   providing a starting volume of metal hydroxide;
   reacting said carbon dioxide with said starting volume of metal hydroxide to produce a metal carbonate;
   gathering said metal carbonate;
   taking some of said metal carbonate and heating it to a temperature that reduces said metal carbonate to metal oxide and carbon dioxide;
   separating said metal carbonate from said carbon dioxide;
   reacting said metal oxide with oxygen to produce an oxidized metal oxide and excess heat;
   reducing said oxidized metal oxide with an acid to produce metal hydroxide.

16. The method according to claim 15, wherein said metal hydroxide is selected from a group consisting of ferrous hydroxide, manganese hydroxide, and lead hydroxide.

17. The method according to claim 15, wherein said metal hydroxide includes ferrous hydroxide, said metal carbonate includes iron carbonate, said metal oxide includes ferrous oxide and said oxidized metal oxide includes ferric oxide.

18. The method according to claim 15, wherein said step of reacting said carbon dioxide with said starting volume of metal hydroxide to produce a metal carbonate is conducted in a carbon dioxide scrubber.

19. The method according to claim 18, wherein said carbon dioxide scrubber is a dry scrubber.

20. The method according to claim 18, wherein said carbon dioxide scrubber is a wet scrubber.

* * * * *